(No Model.) 2 Sheets—Sheet 1.

A. KRAISS.
CLAMP.

No. 262,233. Patented Aug. 8, 1882.

Witnesses
George F Robinson
James H Holcomb

Inventor
Andrew Kraiss
by Bradford Howland
Atty.

(No Model.)
2 Sheets—Sheet 2.
A. KRAISS.
CLAMP.
No. 262,233. Patented Aug. 8, 1882.
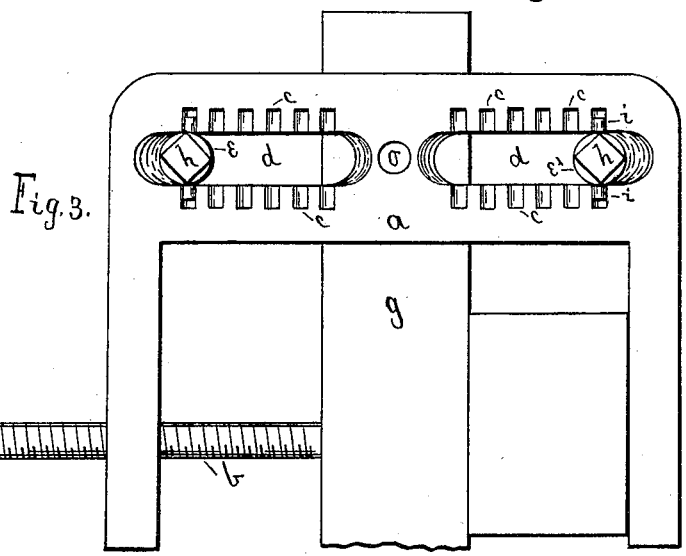
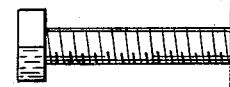
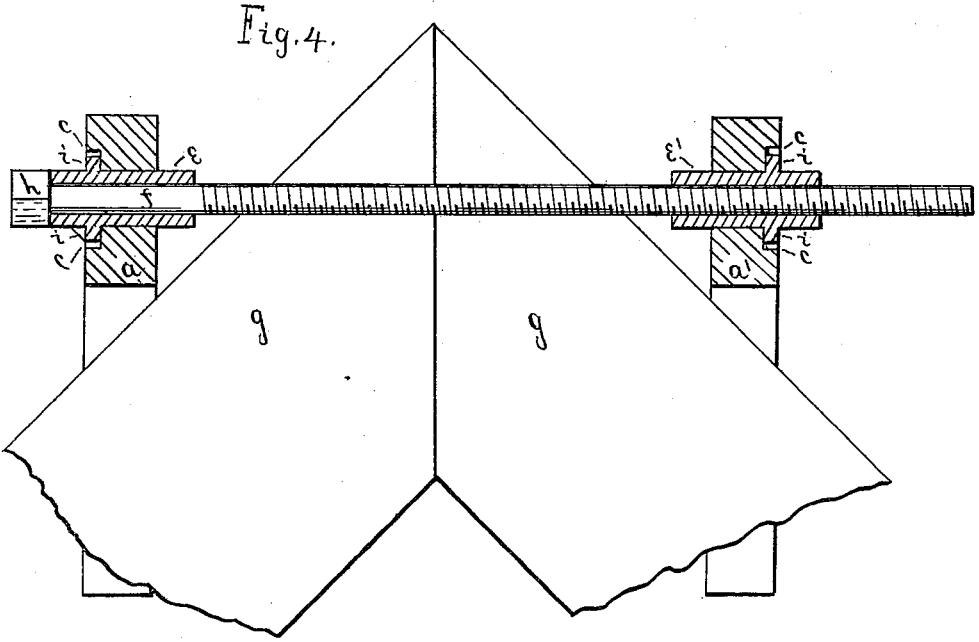
Witnesses
Geo. F. Robinson
James W. Holcomb
Inventor
Andrew Kraiss,
by Bradford Howland
Atty.

UNITED STATES PATENT OFFICE.

ANDREW KRAISS, OF NEW MILFORD, OHIO.

CLAMP.

SPECIFICATION forming part of Letters Patent No. 262,233, dated August 8, 1882.

Application filed April 19, 1882. (No model.)

*To all whom it may concern:*

Be it known that I, ANDREW KRAISS, of New Milford, Portage county, Ohio, have invented a new and useful Improvement in Clamps, of which the following is a specification.

My invention relates to clamps connected with each other by a screw-threaded rod for the purpose of holding and compressing glued pieces of wood or other material forming miter and other joints.

Figure 1:
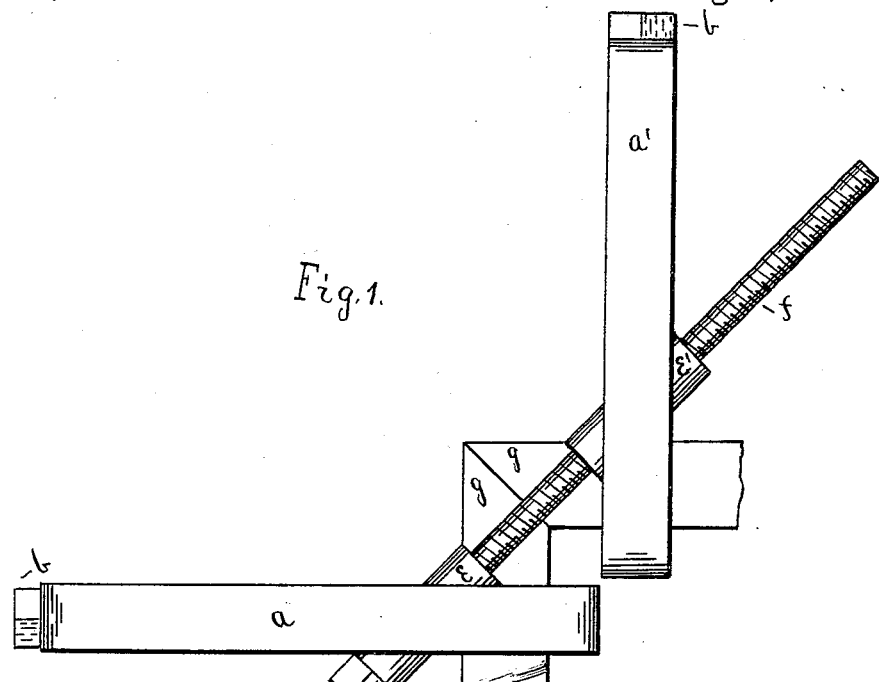
Figure 2:
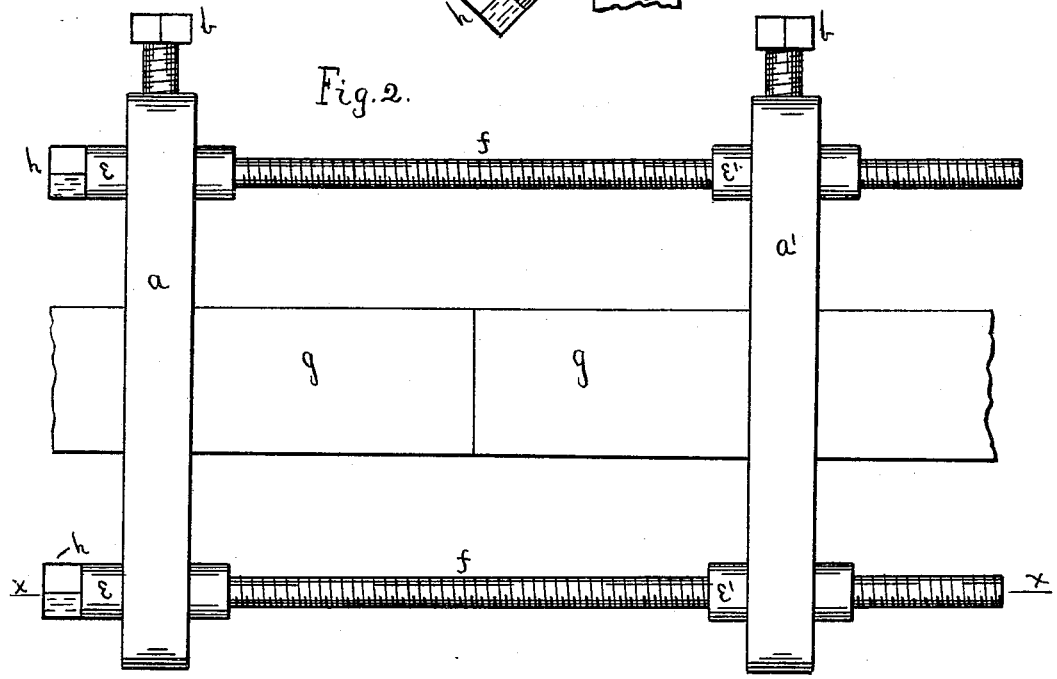

In the drawings, Figure 1 is a plan. Fig. 2 is a plan showing two screw-threaded rods connecting the clamp. Fig. 3 is an end elevation. Fig. 4 is a section of the clamp at the line $x$ in Fig. 2, and representing the rod and sleeves in position.

Clamp $a$ has a set-screw, $b$, by which to fasten it, and is similar to an ordinary clamp, except that it is formed with an opening, $o$, to receive rod $f$, and with slots $d$ and seats $c$ to receive sleeve $e$ and pins $i$. Clamp $a'$ is similarly formed, except that its opening $o'$ is screw-threaded to connect with the screw-thread on rod $f$. Sleeve $e'$ in slot $d$ of clamp $a'$ is also formed with an internal screw-thread to connect with rod $f$. The head $h$ of rod $f$ is suitably formed for turning the rod. If preferred, both sleeves $e$ $e'$ may be threaded, and both right-hand and left-hand threads be formed on rod $f$ to connect with the threads on the sleeves.

In operating the device clamps $a$ $a'$ are first to be placed on pieces $g$ $g$, of wood or other material, which are to be joined together. If the two pieces $g$ $g$ are to be joined in such manner as to require no adjustment of rod $f$ to clamps $a$ $a'$, the pieces may be compressed by inserting rod $f$ through openings $o$ $o'$ in clamps $a$ $a'$ and turning the rod; but if the jointing of pieces $g$ $g$ be such as to require an adjustment of the relative position of rod $f$ to clamps $a$ $a'$, as shown in Fig. 1, the rod $f$, with sleeves $e$ $e'$, should be placed in slots $d$ of the clamps, with pins $i$ in seats $c$ to allow the rod and clamps to assume such relative position as may be necessary to make the joint. Clamps $a$ $a'$ are to be firmly fastened to pieces $g$ $g$ by turning set-screws $b$, and then the pieces may be compressed by turning rod $f$.

In the form of jointed pieces $g$, as shown in Figs. 2, 3, and 4, it may be advantageous, in order to obtain a more direct pressure, to use two rods $f$, as shown, one on each side of pieces $g$.

Sleeves $e$ $e'$ should be made to fit slots $d$, in order to prevent the turning of the clamps on their set-screws $b$.

In adjusting the above-described device pins $i$ of sleeves $e$ $e'$ should be placed in such seats $c$ of clamps $a$ $a'$ as will cause the most direct pressure to be brought to bear on the joint formed by pieces $g$.

I claim as my invention—

1. The clamp $a$, formed with two jaws or arms, and a screw, $b$, for clamping articles between the arms, and a suitable opening, $o$, to receive screw-rod $f$, in combination with clamp $a'$, similarly formed, and with screw-rod $f$, extending through said openings, one of which is screw-threaded to receive the screw-threaded part of rod $f$ for the purpose of clamping together an article held in clamp $a$ and an article held in clamp $a'$, substantially as described.

2. The clamps $a$ $a'$, each formed with one or more slots, $d$, to receive sleeves $e$ $e'$, one of the sleeves being threaded, and seats $c$ to receive pins $i$, in combination with sleeves $e$ $e'$, pins $i$, and the screw-threaded rod $f$, substantially as described.

ANDREW KRAISS.

Witnesses:
BRADFORD HOWLAND,
GEO. F. ROBINSON.